United States Patent [19]

Helal et al.

[11] Patent Number: 4,977,353
[45] Date of Patent: Dec. 11, 1990

[54] COMMUNICATION SYSTEM FOR SINGLE POINT EMERGENCY LIGHTING

[75] Inventors: Mohammed A. Helal; Larry Puckeridge, both of Sydney, Wales

[73] Assignee: Minitronics Pty Limited, Brookvale, Australia

[21] Appl. No.: 401,120

[22] Filed: Aug. 31, 1989

[51] Int. Cl.$^5$ .................... H05B 37/00; H05B 37/03
[52] U.S. Cl. .................... 315/130; 315/131; 315/132; 315/312; 307/66; 320/48; 340/516; 340/636
[58] Field of Search .............. 315/129, 130, 131, 132, 315/133, 312; 307/64, 66; 320/48; 340/333, 514, 516, 636; 324/414, 522

[56] References Cited

U.S. PATENT DOCUMENTS 4,799,039 1/1989 Balcom et al. ................. 340/333

OTHER PUBLICATIONS

"Spectron II", by Dual Lite, 60/1065, 4/88.

Primary Examiner—David Mis
Attorney, Agent, or Firm—Fleit, Jacobson, Cohn, Price, Holman & Stern

[57] ABSTRACT

An emergency lighting system comprising a central monitoring and control unit, a plurality of single point lighting units and a communication system linking all of these units and being configured with a loop topology. Addressing of single point units around the loop is achieved via a protocol whereby a first address is issued by the central unit to the first unit in the loop. This first unit then stores this address as its own and increments the address number before passing it on to the next unit in the loop and so on. When the last unit in the loop finally passes its own incremented address number back to the central unit this provides the central unit with the necessary information to determine the number of single point units in the system.

5 Claims, 12 Drawing Sheets

| 7 | 8 | 9 | MENU UP |
|---|---|---|---|
| 4 | 5 | 6 | MENU DOWN |
| 1 | 2 | 3 | |
| CLEAR | 0 | ENTER | CANCEL |

FIG. 4  KEY PAD

```
THU 20/04/89  11:44:42  0567
OLD TEST DATA
================

UNIT 0003

TIME (MINS)    CURRENT (A)    VOLTAGE (V)
213            1.30           4.01
207            1.29           4.01
209            1.30           4.01
218            1.31           4.01
210            1.29           4.01
213            1.30           4.01

MINUTES        AMPS           VOLTS
```

FIG. 5

| UNIT | ACLIT | POWER | EMLIT | FIRE | SMOKE | ALARM |
|------|-------|-------|-------|------|-------|-------|
| 0123 | YES   | YES   | NO    | YES  | YES   | NO    |
| 0129 | YES   | YES   | NO    | NO   | YES   | NO    |

FIG. 6a STATUS 1 REPORT

THU 20/05/89  11:45:22  0567
STATUS 2

| UNIT | ACLIT | POWER | EMLIT | FIRE | SMOKE | ALARM |
|------|-------|-------|-------|------|-------|-------|
| 0156 | NO    | YES   | NO    | NO   | NO    | NO    |
| 0193 | YES   | NO    | NO    | NO   | NO    | NO    |

FIG. 6b STATUS 2 REPORT

THU 20/05/89  11:50:34  0567
STATUS 3

| UNIT | ACLIT | POWER | EMLIT | FIRE | SMOKE | ALARM |
|------|-------|-------|-------|------|-------|-------|
| 0156 | YES   | YES   | NO    | NO   | NO    | NO    |
| 0193 | N/A   | NO    | YES   | NO   | NO    | NO    |

FIG. 6c STATUS 3 REPORT

```
THU 20/06/89  11:21:45    0567
LAST TEST (ONE)
═══════════════════════════════
UNIT  TIME  CURRENT  VOLTAGE  EMLIT OK 0432  207    1.30      4.01     YES
```

FIG. 7

```
THU 23/11/89  14:23:23 * 29/12 10:30  207  P1
                    UNIT 0567
```

THU 23/06/89  11:25:34   0567
LAST TEST (ALL)

| UNIT | TIME | CURRENT | VOLTAGE | EMLIT OK |
|------|------|---------|---------|----------|
| 0001 | 209  | 1.29    | 4.01    | YES      |
| 0002 | 208  | 1.39    | 4.01    | YES      |
| 0003 | 215  | 1.26    | 4.01    | YES      |
| ...  | ...  | ...     | ...     | ...      |

FIG. 8b

```
THU 23/06/89  11:25:34     0567
LAST TEST (ALL)
========================================

UNIT   TIME    CURRENT   VOLTAGE   EMLIT OK
0001    209      1.29      4.01      YES
THU 23/11/88  11:25:37     0567

UNIT   TIME    CURRENT   VOLTAGE   EMLIT OK
0002    208      1.39      4.01      YES
THU 23/11/88  11:25:40     0567

UNIT   TIME    CURRENT   VOLTAGE   EMLIT OK
0003    215      1.26      4.01      YES
THU 23/11/88  11:25:45     0567

....    ....    ....      ....      ....
```

THU 23/06/89 11:34:45 0567
LAST TEST (FAULTY)

| UNIT | TIME | CURRENT | VOLTAGE | EMLIT OK |
|------|------|---------|---------|----------|
| 0129 | 67   | 1.23    | 4.01    | YES      |
| 0345 | 207  | 0.67    | 4.01    | NO       |

FIG. 9

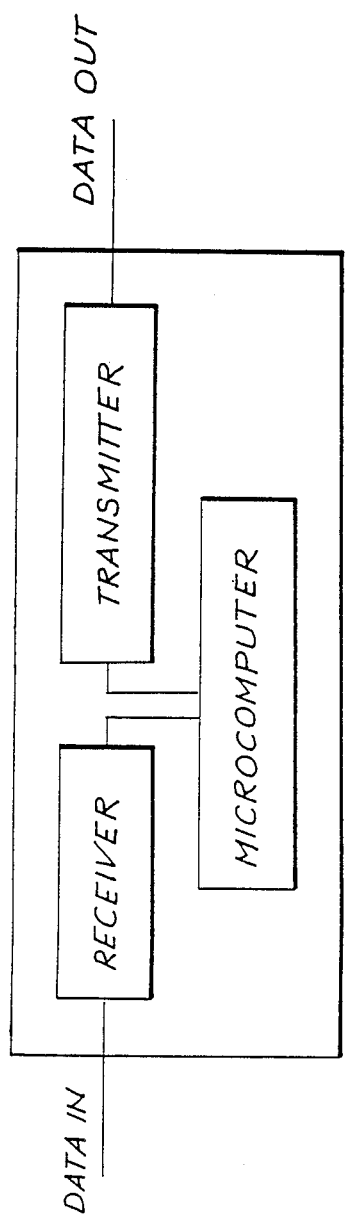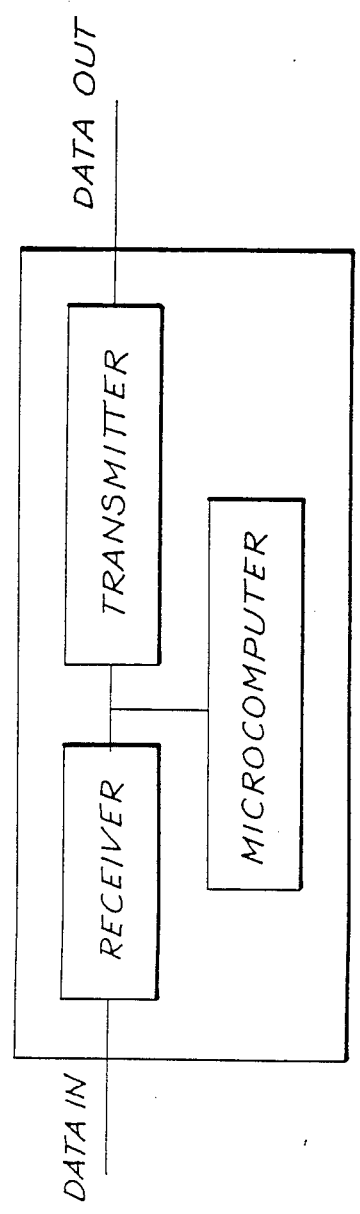
FIG. 11a
FIG. 11b

COMMUNICATION SYSTEM FOR SINGLE POINT EMERGENCY LIGHTING

BACKGROUND OF THE INVENTION

The present invention relates generally to emergency lighting systems and in particular the invention relates to a communication system for linking emergency lighting units for maintenance and testing purposes.

Australian Standard AS2293 consists of two parts:

Part 1—Design and Installation. Reads in part: "The nature of an emergency lighting system that one can never predict when it may be called upon for function. Consequently, while it is important that the system be correctly installed and operate satisfactorily initially, it is equally important that regular inspection and maintenance procedures be instituted to ensure that the system will be in a state of readiness for operation at all times".

Part 2—Inspection and Maintenance. Describes the precise inspection and maintenance procedures necessary to ensure that the system is in a state of readiness at all times.

This product was specifically developed to facilitate compliance with AS2293.2-1987.

Clauses 3.2 and 3.3 described six-monthly and twelve-monthly test and inspection procedures, after which any self-contained emergency luminaire or exit sign which fails to operate satisfactorily shall be either repaired or replaced. Where battery replacement is necessary, the requirements of Clause 3.4 shall apply.

Presently, inspection is carried out physically and performance details are manually recorded. This is a time-consuming and costly exercise. Failure to carry out the prescribed maintenance procedures will result in deterioration of the system, particularly with regard to battery life and efficiency, both of which will reduce drastically.

Due to the high cost of maintenance, and neglect, these inspection procedures are seldom met It is also a fact that replacement of damaged batteries is considerably more expensive than periodic manual maintenance.

Paramount to maintenance costs is the necessity that the installation should be fully operational in the event of an emergency. The proper operation of an emergency lighting system can prevent injuries and save lives.

SUMMARY OF THE INVENTION

The present invention consists in an emergency lighting system comprising a plurality of single point emergency lighting units, a central minitoring and control unit and a communications system interconnecting the lighting units and the central units, the communications system comprising transceiver units in each lighting unit and the central unit, the transceiver units being connected in a loop topology and each lighting unit being allocated an address by following a protocol initiated by the central unit whereby the central unit transmits a first address number to a first lighting unit in the loop which saves the address number and increments it before passing it on to the next unit in the loop, such that the address number finally passed back to the central unit is indicative of the number of units in the loop.

BRIEF DESCRIPTION OF THE DRAWINGS

FIG. 4 schematically illustrates a key pad of the Central Unit of FIG. 3;

FIG. 5 illustrates the format of old test data relating to and stored by a typical unit (in this case No. 003) in an emergency lighting system according to the preferred embodiment and transmitted via the communication system of the invention to be printed by the Central Unit;

FIGS. 6a, 6b and 6c illustrate three status reports printed by the Central Unit;

FIG. 7 illustrates a test report for one single point emergency lighting unit printed by the Central Unit;

FIG. 8a illustrates a normal test report printed by the Central Unit for all Single Point Units in the system;

FIG. 8b illustrates an expanded test report printed by the Central Unit in which the printout for each Single Point Unit is arranged to be separated for insertion in the system log book.

FIG. 9 illustrates a test report printed by the Central Unit, showing a faulty Single Point Unit (No. 0345);

FIGS. 11a, and 11b schematically illustrate the functional connection arrangement of a Single Point Unit (a) when it is being addressed and (b) when it is not being addressed; and FIG. 12 illustrates the display panel of the Central Unit of FIG. 3.

DESCRIPTION OF THE PREFERRED EMBODIMENT

Figure 1:
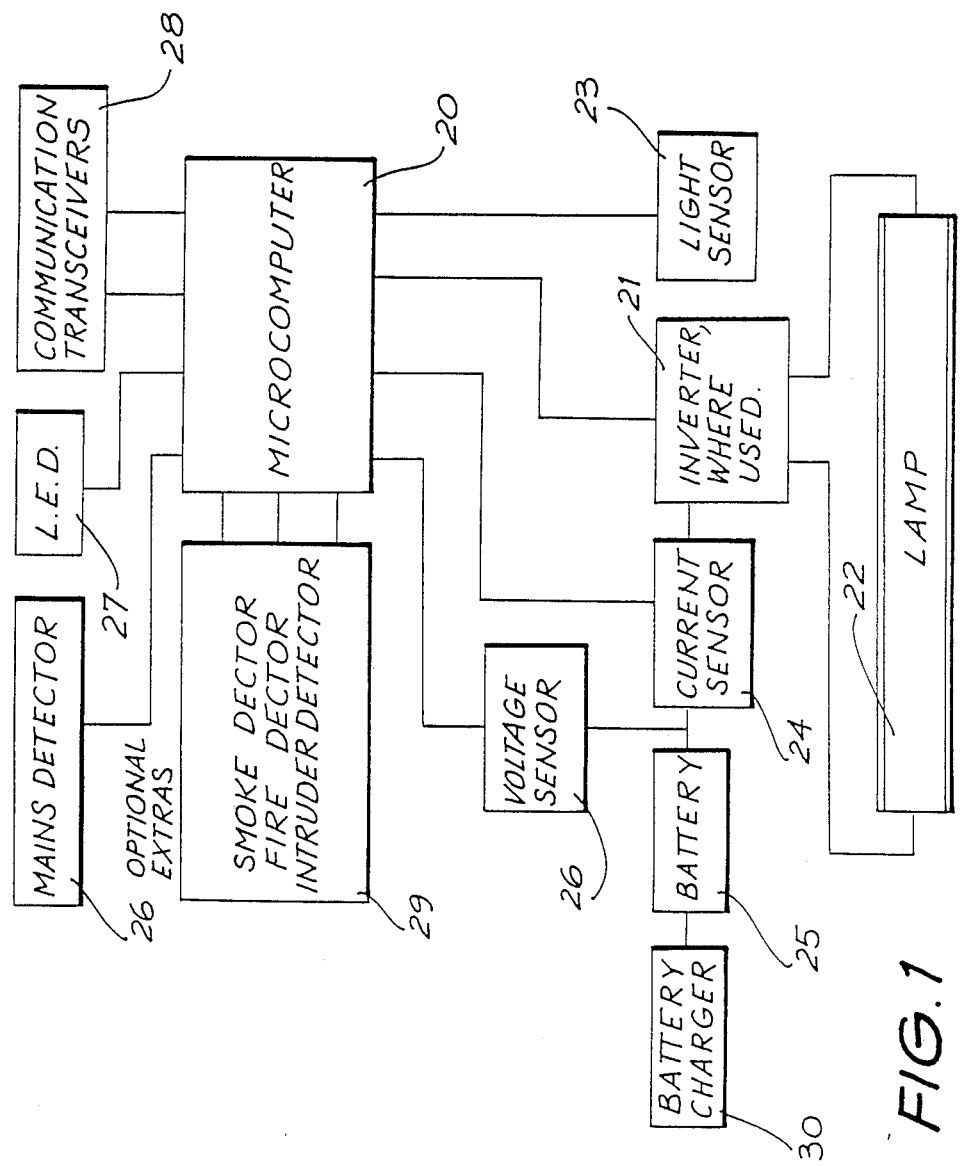
FIG. 1 is a block diagram of a single point emergency lighting unit according to a preferred embodiment of the present invention.
Figure 2:
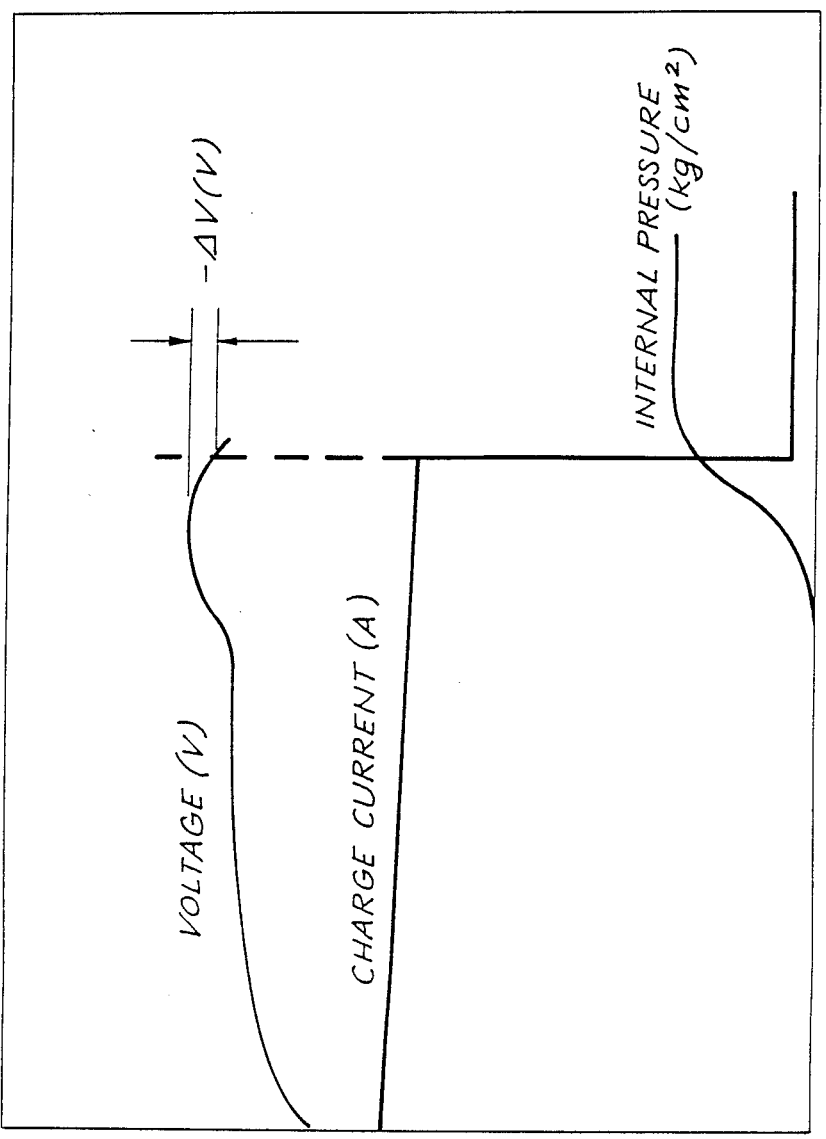
FIG. 2 graphically illustrates the relationship between battery voltage, charge current and internal pressure for NI-CAD batteries used as a source of emergency power in the embodiment of FIG. 1.

Referring to FIGS. 1 and 2, the preferred embodiment of the single point lighting system comprises two types of devices:

(1) The "Single Point Units" (SPU) which have the same function as typical Single Point Units (namely to supply light when mains power fails) except that they have a microcomputer 20 which carries out the self-checking functions, charging control and emergency detection.

(2) The "Central Unit" (CU) which controls all SPUs. The CU has a microcomputer 40, a 2 line by 40 character alphanumeric display 41, key pad 44, and printer 43 to print out reports. The CU controls all SPUs via a single twisted-pair cable 47 that is run from a RS422 transceiver 45 in a loop fashion around all SPUs and returns (48) to the transceiver 45.

The system of the preferred embodiment will test all the emergency lights in an entire building at the same time (up to 10,000) and automatically report on how long each unit could sustain light output, battery current and voltage, and also if the lamp was illuminated at the time of test. Now, with this automatic self-checking system, there is no labour and hence no cost in meeting the Standard.

As well as the self-checking function it can also, if desired, be used to detect smoke, fire, and intruders.

The Single Point Unit of FIG. 1 is an emergency luminaire containing a lamp 22, a battery 25, battery charger 30, inverter (where used) 21, and controls necessary for sensing failure of the normal power supply and for changing over to the emergency supply and vice-versa. These controls comprise a mains detector 26 and the microcomputer 20 which operates in response to the mains detector to switch the investor on and off. The Single Point Unit also includes a communications transceiver 28 for communication with the Central Unit, a light sensor 23 to detect correct operation of the lamp 22 and voltage and current sensors 26 and 24 to determine the status of the battery 25 when testing and when operating under emergency conditions, in order that the lamp 22 may be shut off before the battery is fully discharged.

When the Microcomputer 20 detects loss of mains power supply or a test start command from the CU it disconnects the system from the mains supply and operates the emergency lamp. It also monitors battery voltage, light output, and current. When the battery voltage drops to a pre-set cut off voltage it records the time, voltage, and current then deactivates the lamp and reconnects mains supply.

In prior art systems the battery tends to be charged for a fixed pre-set period no matter how long the previous discharge. So, for example, mains supply interruption for 30 seconds (or even the activation of a momentary test) will cause the battery to receive a full charge period. This may result in overcharging with consequent reduction in battery life.

From typical charging characteristics of NI-CAD batteries (FIG. 2), the battery voltage increases during charging and, when fully charged, it starts to drop.

With the automatic self-checking system of the present embodiment, the battery will not be charged unless the mains failure (or test) is longer than one minute. The system will then charge the battery until its voltage peaks and starts to drop. The charger is then switched to trickle charging. Thus the battery will receive only so much charge as it needs.

In extreme environments battery voltage peak does not occur. This situation is catered for in that the charging period is pre-set to a maximum of 32 hours, to protect the battery from overcharging.

After the battery has received a high charge and is fully charged the system is placed on trickle charge indefinitely to counter the self-discharge of the battery. The system continuously monitors battery voltage and if for any reason the voltage drops below a certain level it then starts on high charging again until the peak and dip in voltage is detected. The battery only ever receives as much charge as it needs and, therefore, battery life is increased.

Emergency lamps 22 can be either Incandescent or Fluorescent.

Incandescent lamps are operated through a relay or a solid-state switch controlled by the microcomputer.

Fluorescent lamps are operated through a high frequency, high efficiency inverter 21 that provides stable light output during the emergency period. This approach improves the luminaires classification and hence reduces the number required to cover a specific area according to Standard AS2293.1-1987.

The SPU uses a light sensor 23 to monitor light output during normal operation and during emergency conditions. Under normal conditions, the light output is compared to a pre-set minimum level, while in emergency conditions the change in light level is detected to determine whether the emergency lamp is working or not.

In order to extend battery life a pre-set cut-off voltage is detected and when the battery voltage drops to this level the lamp is turned off. The pre-set value is varied depending on the number of NI-CAD cells used in the case of NI-CAD batteries, or on battery voltage in the case of Lead Acid batteries.

In traditional emergency lighting, LEDs on the Single Point Unit indicate one of three things:
(1) LED OFF - There is no mains power to the SPU.
(2) LED FLASHING - The SPU is on high charging.
(3) LED ON CONTINUOUSLY - The SPU is on trickle charging.

In the automatic self-checking system of the present embodiment the LED indicates one of five things:
(1) LED OFF - Indicates that either the mains power is off or the SPU is under test from the Central Unit and the communication is functioning.
(2) LED ON CONTINUOUSLY - Indicates that the battery has been charged and the communication is functioning.
(3) LED flashing ½ Hz (normal speed) - Indicates that the battery is on high charging and communication is functioning.
(4) LED flashing ⅛ Hz (slow speed) - Indicates that the communication loop is broken.
(5) LED flashing 2 Hz (fast speed) - Indicates that the RS422 cable connection is reversed.

In typical installations, the distance between any two light SPUs may be up to 200 meters. Also the cable may run next to 240V wiring and normal fluorescent lighting. The automatic self-checking system is designed to communicate over larger distances and is not sensitive to noise. The ideal choice is RS422 which can communicate up to 1Km and its differential nature makes it tolerant to mutually induced noise.

Figure 10:
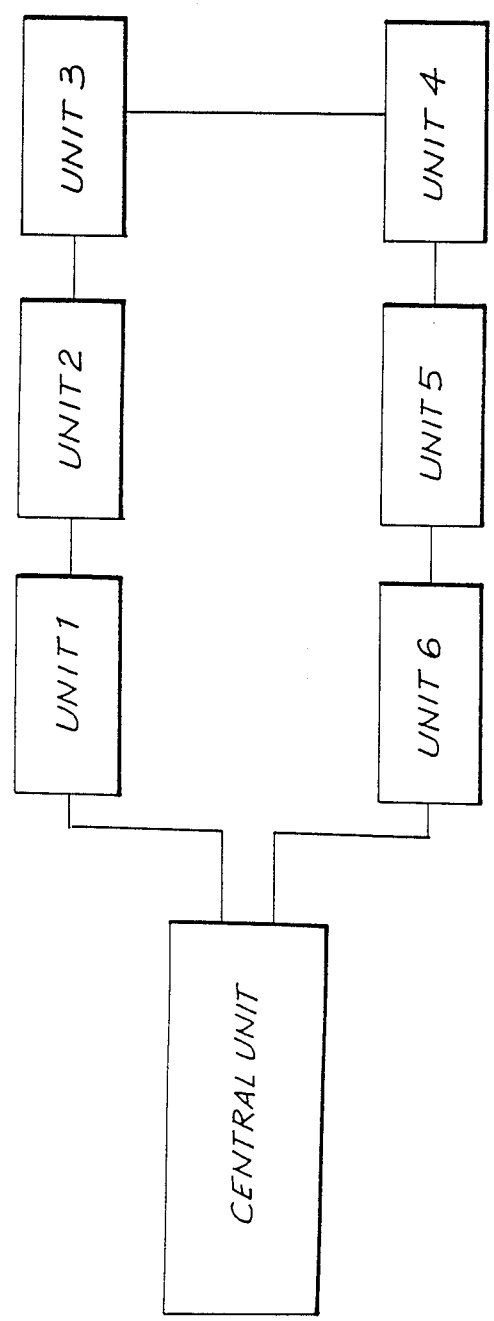
FIG. 10 schematically illustrates the configuration of the communications system of the present invention.

Referring to FIG. 10 the system uses a loop topology for data communication. This has the advantage of connecting all SPUs to the SU by using only one cable (single twisted-pair), no matter how many SPUs, provided the distance between any two SPUs is less than 1Km. The distance travelled by data is irrelevant. The disadvantages of this type of topology are speed and reliance on all SPUs to be functioning. Provisions that have been included to overcome these disadvantages are discussed below.

With a loop topology every SPU must receive the information and then re-transmit it. If a large number of SPUs are connected, this can lead to a considerable delay.

To speed-up communication, a hardware circuit is included so that if the SPU is not being addressed by the CU then the received information is re-transmitted as it is being received (refer to FIG. 11a), that is, the circuit acts as a simple booster station only, adding two propagation delays. If the SPU is being addressed then it transmits information onto the line (refer to FIG. 11b).

If any one SPU fails then the communication loop will fail. This, however, in no way affects the operation of the remainder of the SPUs either in normal operating conditions or in emergency situations; so, for example, if mains supply fails the remaining SPUs will still operate the emergency lamps. This feature is a means of ensuring that all SPUs are functioning and that faulty SPUs cannot be ignored.

If any one SPU fails, this is detected by the CU within four seconds and an alarm sounds. Once the operator detects the alarm the next step is to find out which SPU is faulty and replace it. To do this, a physical inspection of the LEDs on all SPUs is necessary until the SPU with its LED flashing at a rate other than ⅛ Hz rate is found. This is the faulty SPU which should be checked.

With any system such as this there must be an addressing system in order for each SPU to know what unit number it is. This is normally done by way of jumpers or DIP switches on the Printed Circuit Board. However, this method is costly, needs many microcomputer I/0 lines, and also leaves a possibility that incorrect addresses can be set. With loop topology the need for hardware to dictate the address of each unit is eliminated. The address is established entirely by software.

The means by which this is achieved is as follows - the first SPU receives an address number from the CU (address 0); this number is stored in SPUs memory as its unit number; this number is then incremented and sent on to the next SPU which stores the incremented number in its memory as its unit number. The process is repeated until a number is returned to the CU. The number received by the CU is equal the number of SPUs on the loop.

It is therefore the physical position of the SPU on the loop that defines its address number.

SPUs can be added to or removed from the loop by breaking in wherever required to add or remove a unit. The CU will then automatically adjust the number of units which it recognises, by renumbering each SPU as explained above.

As each SPU holds its own history data, there is no need for the CU to map information regarding SPUs to specific address numbers. The only mapping required is to note any change in address number against the physical location of the respective SPU.

Figure 3:
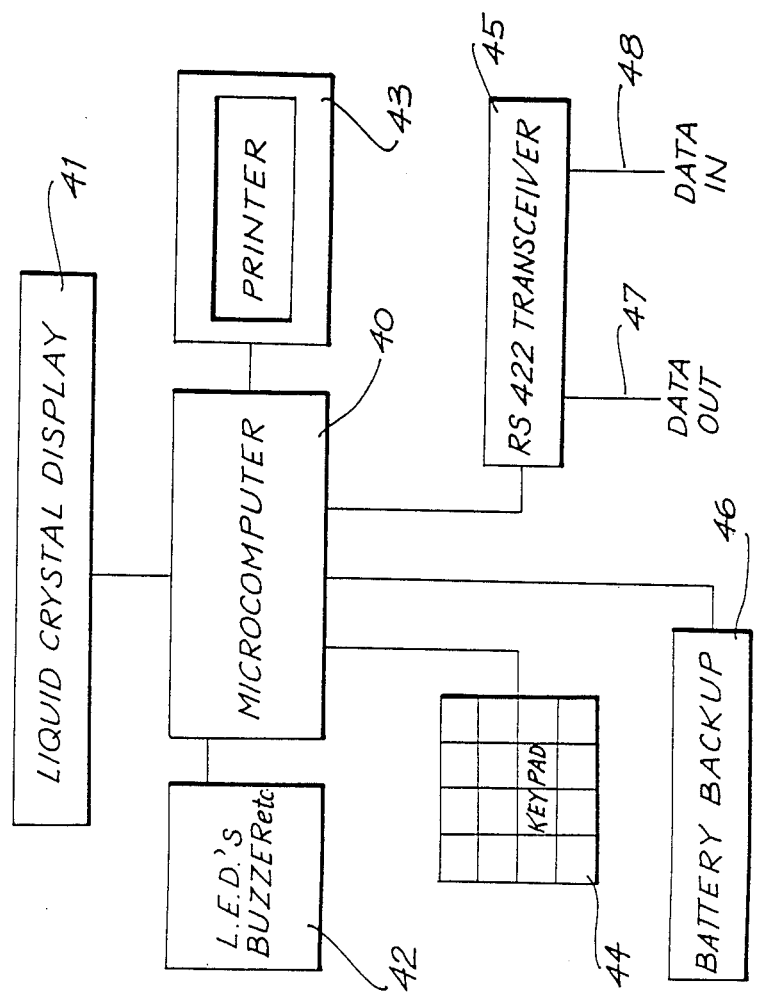
FIG. 3 is a block diagram of a preferred Central Unit for the lighting system embodying the present invention.

Referring to FIG. 3, the Central Unit consists of a 2 Line by 40 Character Alphanumeric Liquid Crystal Display 41, key pad 44 (see also FIG. 4), printer 43, and battery backup 46. It also has:

(1) A buzzer 42 which sounds at the end of a test if there were any faulty SPUs detected or if mains power failure in any SPU was detected.

(2) A set of contacts that can be interfaced to an external siren (not shown). These contacts close if the communication loop is broken or if an alarm condition (smoke, fire or intruders) is detected by any SPU.

(3) An orange LED (not shown) to indicate that CU mains supply is connected.

(4) A red LED (not shown) that will operate after a test if any faulty SPUs were detected.

(5) A green LED (not shown) that will operate after a test if all SPUs operated satisfactorily. The CU has two display modes:

(1) Normal display mode In normal conditions the display top line shows the day, date, time of day, test date, test time, test length, and printing format respectively. The number of units connected to the system is displayed on the second line. A typical display is shown in FIG. 12.

(2) Menu display mode
One of the following lines is displayed:
Print Status 1
Print Status 2
Print Status 3
Print Menu
Test Start (ONE)
Test Start (ALL)
Test Stop
Print OLD Test Data
Print LAST Test (ONE)
Print LAST Test (ALL)
Print LAST Test (FAULTY)
Time
Date
Format
Test Date
Test Time
Test Length To go from Normal Display to Menu Display a four digit PIN (personal identification number) must be entered, this number cannot be changed by the user. The PIN number will be issued by the manufacturer—each CU having a unique number. The CU will not display this PIN number as it is being entered. Once in Menu mode the display will change to "Print Status 1". If desired the menu can be printed by displaying "Print Menu" and pressing Enter (refer to FIG. 4). If another function is required it is a simple matter of moving up or down the list with either the Up Menu key or Down Menu key (FIG. 4) until the required function is displayed and then pressing the Enter key.

The CU has a software real time clock (24 hour format) in order to test the SPUs at a pre-set time. The "Time" function allows the user to change the current time. The CU also needs to know the date in order to test the SPUs at a pre-set date. The "Date" function allows the user to change the current date. The current day will be calculated by the CU.

If only one SPU needs to be tested it is not necessary to test all SPUs, this would waste power and reduce battery life since each battery can only cycle so many times. With the "Test Start (ONE)" function the unit number is entered and only that particular SPU will be tested.

If it is desired to test all SPUs, the "Test Start (ALL)" function can be selected to start testing every SPU in the loop.

The "Test Stop" function is used to stop a currently running test.

Each SPU retains six sets of test results—the latest test results plus the five previous test results. Thus the performance history of a particular SPU can be obtained for further analysis. To obtain old test data for one SPU, the "Print OLD Test Data" function is selected for the required SPU number. A report will then be printed as typified by the example of FIG. 5.

Once six test results are stored, the oldest test data is lost. However, the hard copy of these results should still be stored with the maintenance records in a log book. This information is useful in determining battery status and the need for battery replacement. It also provides an indication of overall circuit performance.

The CU monitors the status of several detector systems, such as mains power supply, light, fire, smoke, intruders, and battery charging status. One of five possible messages (Alarm, Smoke, Fire, Mains or Loop) is displayed on the second line, when a change from normal conditions is detected.

There are three different reports available for printing:
(1) Print Status 1 (refer to FIG. 6a)

If any of the SPUs detect fire, smoke, or intruders, the alarm will sound and a message will be displayed defining the alarm cause. The alarm sound will switch off upon entering the Menu mode. To find out which SPU issued the alarm, the "Print Status 1" function will print the status of those SPUs that are not in normal operating condition. If the SPUs no longer sense a problem the printing of the report will clear the alarm message displayed. The message displayed will remain for as long as the problem is detected by the SPUs.

If mains supply to any of the SPUs fails at any time a message "Mains" will be displayed and the buzzer will sound. As with the "Alarm" condition, while mains power is interrupted the printing of the report will not remove the message displayed.

The message "Loop" appears on display if the loop is broken. The alarm also sounds. The message is removed once the loop is whole again.

The status of lamp and battery charging does not affect the display, alarm or buzzer. They simply let the operator know if the lamp is working and if the battery is on high charging or not.

The "Print Status 2" report (refer to FIG. 6b) prints the status of those SPUs which either had a mains supply failure or their mains operated lamp is installed but not working.

The "Print Status 3" report (refer to FIG. 6c) prints the status of those SPUs which either had a mains supply failure of their emergency power operated lamp is not working.

The "Print Last Test (ONE)" (refer to FIG. 7) report gives information on the last or current test for one particular SPU. It shows how long the emergency light was maintained by the battery. It also reports on battery voltage and current as at the end of the test and if the light was on at the end of the test.

The "Print Last Test (ALL)" (refer to FIGS. 8a and 8b) report is the same as the one above except that it reports on all SPUs. This report is printed in two formats—FIG. 8a shows the normal listing, while FIG. 8b shows the format that will be used in the log book required by Standard AS2293-2, 1987 clause 1.4.2.

The "Print Last Test (FAULTY)" (refer to FIG. 9) report is the same as PRINT LAST TEST (ALL) except that it only prints those SPUs that did not have the lamp on at the end of the test, or if the battery could not sustain light output for more than 90 minutes.

At the end of an automatic test (in which time, date and duration is programmed) a report can be printed automatically to report on all SPUs, faulty SPUs only, or "No Print Out" can be selected. Also the "format" of the "Last Test" report described above can be selected. The red LED and buzzer will be activated if there were any faulty SPUs detected. If all SPUs tested satisfactorily the green LED will light.

The "Test Date" is the date on which the automatic test is to occur. At the end of the automatic test this date will advance a fixed number of weeks (this is to be selected when ordering the CU) so that if the first day programmed is a Sunday then subsequent tests will also be on a Sunday. The user can thus decide what day the test will always be conducted on.

The "Test Time" is the time at which the automatic test is to occur. The CU will not adjust this time at the end of the test.

The "Test Length" is the length of the automatic test expressed in minutes. It can be selected from 1 to 255 minutes. The CU will not adjust this length at the end of the test.

The automatic self-checking system described will allow compliance with Australian Standards requirements by ensuring that the periodic test procedures (Clause 3.2, AS2293-2) are performed on time, whereas at present they are rarely met. Also the system will assist greatly in ensuring compliance with the Standards requirements to maintain an up-to-date log book with all important data in it (Clause 1.4.2, AS2293-2). Further, by storing previous test results, battery performance history can be determined to assist in deciding on battery replacement intervals. Overall system reliability is accordingly improved.

It is obvious that the system will help building owners to reduce maintenance costs considerably and will also extend battery life (due to the charging method).

The system allows for monitoring of different parameters around a building, namely, smoke, fire, or intruders. If required it is possible to monitor other parameters to suit the needs of particular customers.

Although the foregoing system is for single point, self contained battery units, adaptation can be made for central systems installations.

The claims defining the invention are as follows:

1. An emergency lighting system comprising a plurality of single point emergency lighting units, a cental minitoring and control unit and a communications system interconnecting the lighting units and the central unit, the communications system comprising transceiver units in each lighting unit and the central unit, the transceiver units being connected in a loop topology and each lighting unit being allocated an address by following a protocol initiated by the central unit whereby the central unit transmits a first address number to a first lighting unit in the loop which saves the address number and increments it before passing it on to the next unit in the loop, such that the address number finally passed back to the central unit is indicative of the number of units in the loop.

2. The emergency lighting system of claim 1 wherein each single point lighting unit includes a battery, a control unit and mains power detection means, the control unit being responsive to a signal from the mains power detection means to operate an emergency lamp powered by the battery upon mains power failure, independently of any control from the central unit.

3. The emergency lighting system of claim 2 wherein the control unit in each single point unit includes self testing circuitry comprising voltage and current sensing means and the control unit is arranged to switch to a test mode in response to a signal transmitted over the communication system from the central unit whereby the control unit operates the lamp from the battery and measures battery voltage and current by way of the respective sensing means and stores the measured values.

4. The emergency lighting system of claim 3 wherein each control unit is arranged to store a plurality of historical test measurements for the respective single point unit as well as the measurements of the latest test for that unit.

5. The emergency lighting unit of claim 4 wherein each control unit is arranged to transmit to the central unit via the communications system either the latest test results or the historical test results for the respective single point unit, in response to a request signal via the communications system from the central unit. DATED this 21 day of August 1989.

* * * * *